(12) United States Patent
Kawamura et al.

(10) Patent No.: US 10,836,247 B2
(45) Date of Patent: Nov. 17, 2020

(54) VEHICLE POWER ASSIST SYSTEM

(71) Applicant: NTN CORPORATION, Osaka (JP)

(72) Inventors: Mitsuo Kawamura, Iwata (JP);
Kentaro Nishikawa, Iwata (JP);
Tomomi Ishikawa, Iwata (JP);
Yasuyuki Fujita, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/358,842

(22) Filed: Mar. 20, 2019

(65) Prior Publication Data
US 2019/0217696 A1    Jul. 18, 2019

Related U.S. Application Data

(63) Continuation of application No. PCT/JP2017/033762, filed on Sep. 19, 2017.

(30) Foreign Application Priority Data

Sep. 21, 2016   (JP) .................... 2016-184294
May 30, 2017    (JP) .................... 2017-106330

(51) Int. Cl.
*B60K 7/00*    (2006.01)
*B60K 6/445*   (2007.10)
(Continued)

(52) U.S. Cl.
CPC ............. *B60K 7/0007* (2013.01); *B60K 6/26* (2013.01); *B60K 6/28* (2013.01); *B60K 6/40* (2013.01);
(Continued)

(58) Field of Classification Search
CPC ... B60K 7/0007; B60K 7/0038; B60K 7/0092
(Continued)

(56) References Cited

U.S. PATENT DOCUMENTS 5,087,229 A * 2/1992 Hewko ................ B60K 7/0007
                                            180/65.51
5,246,082 A * 9/1993 Alber ...................... A61G 5/04
                                            180/65.51
(Continued)

FOREIGN PATENT DOCUMENTS

JP    2011-131674    7/2011
JP    2016-25789     2/2016
(Continued)

OTHER PUBLICATIONS

International Search Report dated Dec. 19, 2017 in Corresponding International Application No. PCT/JP2017/033762.
(Continued)

*Primary Examiner* — Jeffrey J Restifo

(57) ABSTRACT

A vehicle power assist system can be applied to a vehicle with a driven wheel (4) that is mechanically unconnected to a main drive source (5) such as an internal combustion engine. The driven wheel (4) is supported by a wheel support bearing assembly (31) to which a drive assist, motor generator (8) is mounted. A rotor of the motor generator (8) is directly fixed to a rotational ring of the wheel support bearing assembly (31) without interposition of a speed reducing mechanism or a speed increasing mechanism. The vehicle power assist system includes a power storage unit (19) configured to store a regenerative power generated by the motor generator (8) and to supply the stored power to the motor generator (8).

6 Claims, 5 Drawing Sheets

(51) Int. Cl.
  *B60L 15/20* (2006.01)
  *B60K 6/52* (2007.10)
  *B60R 16/03* (2006.01)
  *B60L 50/50* (2019.01)
  *B60K 6/40* (2007.10)
  *B60L 1/00* (2006.01)
  *B60L 50/13* (2019.01)
  *B60L 9/18* (2006.01)
  *B60K 6/28* (2007.10)
  *B60K 6/48* (2007.10)
  *B60K 6/26* (2007.10)
  *B60L 7/14* (2006.01)
  *B60K 6/54* (2007.10)

(52) U.S. Cl.
  CPC ............... *B60K 6/445* (2013.01); *B60K 6/48* (2013.01); *B60K 6/52* (2013.01); *B60K 6/54* (2013.01); *B60K 7/00* (2013.01); *B60L 1/00* (2013.01); *B60L 7/14* (2013.01); *B60L 9/18* (2013.01); *B60L 15/20* (2013.01); *B60L 15/2045* (2013.01); *B60L 50/13* (2019.02); *B60L 50/50* (2019.02); *B60R 16/03* (2013.01); *B60K 2007/0038* (2013.01); *B60K 2007/0092* (2013.01); *B60L 2220/42* (2013.01); *Y02T 10/6221* (2013.01); *Y02T 10/6265* (2013.01); *Y02T 10/7005* (2013.01); *Y02T 10/7077* (2013.01); *Y02T 10/7275* (2013.01)

(58) Field of Classification Search
  USPC ...................................... 180/65.51
  See application file for complete search history.

(56) References Cited

U.S. PATENT DOCUMENTS

| | | | | |
|---|---|---|---|---|
| 5,382,854 A * | 1/1995 | Kawamoto | .......... | B60K 7/0007 180/65.6 |
| 5,465,806 A * | 11/1995 | Higasa | ............. | B60K 7/0007 180/165 |
| 5,691,584 A * | 11/1997 | Toida | .............. | B60K 7/0007 180/65.51 |
| 6,100,615 A * | 8/2000 | Birkestrand | ......... | B60L 50/66 310/75 C |
| 6,328,123 B1 * | 12/2001 | Niemann | ............. | B60K 7/0007 180/65.51 |
| 6,386,553 B2 * | 5/2002 | Zetterstrom | ......... | B60G 3/20 180/413 |
| 7,228,928 B2 * | 6/2007 | Mizutani | .......... | B60L 1/003 180/65.51 |
| 7,240,748 B2 * | 7/2007 | Kira | .................. | B60K 6/44 180/65.25 |
| 7,306,065 B2 * | 12/2007 | Nagaya | ................ | B60G 3/20 180/65.51 |
| 7,350,605 B2 * | 4/2008 | Mizutani | ............. | B60K 7/0007 180/65.1 |
| 7,445,067 B2 * | 11/2008 | Marsh | ................. | B60G 3/00 180/65.51 |
| 7,528,518 B2 * | 5/2009 | Maeda | ................. | B60K 6/26 310/67 R |
| 7,571,784 B2 * | 8/2009 | Tashiro | ............... | B60K 7/0007 180/65.51 |
| 7,717,203 B2 * | 5/2010 | Yoshino | ............... | B60K 7/0007 180/65.51 |
| 7,735,589 B2 * | 6/2010 | Sugiyama | ............ | B60K 7/0007 180/55 |
| 7,766,110 B2 * | 8/2010 | Suzuki | ................. | B60G 3/01 180/65.31 |
| 7,789,178 B2 * | 9/2010 | Mizutani | ............. | B60G 3/20 180/65.51 |
| 7,825,623 B2 * | 11/2010 | Yanagihara | ......... | B60K 7/0007 318/812 |
| 7,938,211 B2 * | 5/2011 | Yoshino | ............... | B60K 7/0007 180/65.51 |
| 7,958,959 B2 * | 6/2011 | Yogo | ........................ | B60G 3/20 180/65.51 |
| 8,002,060 B2 * | 8/2011 | Komatsu | ............... | B60K 7/0007 180/65.51 |
| 8,186,467 B2 * | 5/2012 | Yoshino | ............... | B60K 7/0007 180/65.51 |
| 8,316,973 B2 * | 11/2012 | Walter | ................ | B60K 7/0007 180/65.51 |
| 8,459,386 B2 * | 6/2013 | Pickholz | ............. | B60K 7/0007 180/65.31 |
| 8,596,395 B2 * | 12/2013 | Hirano | ................ | B60K 7/0007 180/65.51 |
| 8,678,117 B2 * | 3/2014 | Carabelli | .............. | H02K 7/102 180/65.51 |
| 8,820,448 B2 | 9/2014 | Shiraki et al. | | |
| 8,857,545 B2 * | 10/2014 | Lee | ...................... | B60K 7/0007 180/65.6 |
| 8,863,873 B2 * | 10/2014 | Lee | ...................... | B60K 7/0007 180/65.51 |
| 8,950,528 B2 * | 2/2015 | Ozaki | ................... | B60L 3/0061 180/65.285 |
| 9,126,500 B2 * | 9/2015 | Ozaki | ................... | B60L 3/0061 |
| 9,150,093 B2 | 10/2015 | Shiraki et al. | | |
| 9,184,583 B2 * | 11/2015 | Ozaki | .................. | B60K 7/0007 |
| 9,352,645 B2 | 5/2016 | Shiraki et al. | | |
| 9,381,802 B2 * | 7/2016 | Figuered | ............ | B60K 7/0007 |
| 9,387,758 B2 * | 7/2016 | Heinen | ................ | B60K 7/0007 |
| 9,694,819 B2 | 7/2017 | Honda et al. | | |
| 9,724,995 B2 * | 8/2017 | Ozaki | .................. | B60L 3/0061 |
| 10,047,808 B2 * | 8/2018 | Szewczyk | ............. | F16D 55/225 |
| 2012/0001521 A1 * | 1/2012 | Shiraki | ................ | B60K 7/0007 310/67 R |
| 2014/0368092 A1 * | 12/2014 | Shiraki | ................ | B60K 7/0007 310/67 R |
| 2015/0367721 A1 | 12/2015 | Shiraki et al. | | |
| 2016/0059712 A1 * | 3/2016 | Jang | ........................ | H02M 3/04 307/10.1 |
| 2016/0368496 A1 * | 12/2016 | Honda | ..................... | B60K 1/02 |
| 2017/0324297 A1 * | 11/2017 | Furuuchi | ................ | B60K 7/00 |

FOREIGN PATENT DOCUMENTS

| | | |
|---|---|---|
| JP | 2016-26465 | 2/2016 |
| JP | 5899009 | 3/2016 |
| JP | 2016-54635 | 4/2016 |
| JP | 2016-100948 | 5/2016 |
| JP | 2016-150739 | 8/2016 |

OTHER PUBLICATIONS

English Translation by WIPO of the International Preliminary Report on Patentability dated Apr. 4, 2019 in corresponding International Patent Application No. PCT/JP2017/033762 (9 pages).
Extended European Search Report, dated Apr. 28, 2020, in corresponding European Application No. 17853042.4 (7 pp.).

* cited by examiner

VEHICLE POWER ASSIST SYSTEM

CROSS REFERENCE TO THE RELATED APPLICATION

This application is a continuation application, under 35 U.S.C. § 111(a) of international patent application No. PCT/JP2017/033762, filed Sep. 19, 2017, which claims priority to Japanese patent applications No. 2016-184294, filed Sep. 21, 2016 and No. 2017-106330, filed May 30, 2017, the entire disclosures of which are herein incorporated by reference as a part of this application.

BACKGROUND OF THE INVENTION

Field of the Invention

The present invention relates to a vehicle power assist system and a vehicle driven-wheel regenerative system, which—in a vehicle, such as a front wheel drive vehicle or a rear wheel drive vehicle, with a driven wheel that is mechanically unconnected to a main drive source which is either a motor, an internal combustion engine, or a hybrid design that combines these—perform power assisting and regenerative braking operations with the driven wheel of the vehicle to improve vehicle performances such as traveling performance, braking performance and fuel consumption rate of the vehicle.

Description of Related Art

In the past, a vehicle driving system has been proposed which includes a first motor generator to be mechanically connected to one of: a pair of front wheels and a pair of rear wheels of a vehicle, and a second motor generator to be mechanically connected to the other one of: the pair of front wheels and the pair of rear wheels (see, for example, Patent Document 1). According to this, the first motor generator, the second motor generator and a battery are electrically connected to each other via a control unit to enable mutual exchange of energy among them, thereby allowing for recovery of energy from both of the front wheels and the rear wheels during a braking operation. Thus, improved energy efficiency can be expected.

Also, an auxiliary power system that further improves energy efficiency without requiring complex control has been proposed, in which a motor generator installed to a vehicle is configured to be capable of transferring a mechanical power only to and receiving a mechanical power only from rear wheels that are not driven by a main power system, and a power source unit is configured to supply an electrical drive power only to the motor generator and store a regenerative power only from the motor generator (see, for example, Patent Document 2).

RELATED DOCUMENT

Patent Document

[Patent Document 1] JP Patent No. 5899009
[Patent Document 2] JP Laid-Open Patent Publication No. 2016-025789

SUMMARY OF THE INVENTION

In the configuration described in Patent Document 1, regenerative powers are generated, for example, by the first motor generator and the second motor generator during a braking operation of the vehicle. The braking levels of the front and rear regenerative brakes have to be adjusted in order to stabilize the vehicle's posture so that the vehicle does not cause abnormal behavior. Thus, their regenerative powers fluctuate during the braking operation, thereby requiring the use of quite complex control to store such regenerative powers of varying levels in a common battery. To overcome this issue, Patent Document 2 proposes the provision of a motor generator configured to be capable of transferring a mechanical power only to and receiving a mechanical power only from driven wheels and the provision of a power source unit configured to supply an electrical drive power only to the motor generator and store a regenerative power only from the motor generator.

However, according to the arrangement described in Patent Document 2, the auxiliary power system is configured such that a battery is connected with the motor generator, and the motor generator transfers a mechanical power through a clutch, a mechanical power distributing mechanism and a driveshaft to the driven wheels (tires). Therefore, the deployment of the auxiliary power system requires these components to be used and arranged in a configuration similar to that found in a 4-wheel drive vehicle, thereby resulting in a complicated structure and an increased vehicle weight.

Also, though the clutch can be disengaged when the motor generator need not be operated so that the motor generator can be mechanically unconnected to the driven wheels. However, the mechanical power distributing mechanism and the driveshaft are still mechanically connected to the driven wheels, thereby increasing the running resistance of the vehicle. Furthermore, a battery which is specifically dedicated to the motor generator must be installed to the vehicle, thereby adding the weight of the battery on the vehicle. In addition, the fuel economy of the vehicle can go down in certain states of charge of the battery.

An object of the present invention is to provide a vehicle power assist system, which can perform drive assist, regenerative braking and power generation with a driven wheel of a vehicle to improve vehicle performances such as traveling performance, braking performance and fuel consumption rate of the vehicle and which provides a simplified structure to generate an auxiliary drive power, thereby minimizing the increase of the vehicle weight. Another object of the present invention is to provide a vehicle power assist system that is advantageous both from a wiring perspective and in terms of enhanced reliability. Yet another object of the present invention is to provide a vehicle driven-wheel regenerative system, which can perform regenerative braking and power generation with a driven wheel of a vehicle to improve vehicle performances such as braking performance and fuel consumption rate of the vehicle and which successfully reduces parts count to provide a simplified structure, thereby minimizing the increase of the vehicle weight. Now, the overview of the present invention will be described with the aid of reference characters used in the drawings for illustrating embodiments of the invention.

A vehicle power assist system according to the present invention is a vehicle power assist system for a vehicle 2 with a driven wheel 4 that is mechanically unconnected to a main drive source 5 that drives the travel of a drive wheel 3, the vehicle power assist system including:

a drive assist, motor generator 8 configured to be capable of generating an electrical power from rotations of the driven wheel 4 and receiving a supplied electrical power to drive the driven wheel 4 into rotation, h the motor generator 8 being mounted to a wheel support bearing assembly 31 that supports the driven wheel 4, the motor generator 8 having a rotor 42 fixed to a rotational ring of the wheel support bearing assembly 31 without interposition of a speed reducing mechanism or a speed increasing mechanism; and a power storage unit configured to store a regenerative power generated by the motor generator and to supply the stored power to the motor generator 8.

It should be noted that such a driven wheel 4 is driven by the motor generator 8 only for auxiliary driving purpose and is mechanically unconnected to the main drive source 5, and accordingly, it is referred to as a "driven wheel". The main drive source 5 may comprise only an internal combustion engine, or a combination of an internal combustion engine 5a and an electric motor, or—alternatively—only an electric motor.

In such a configuration, the provision of a motor generator 8 that generates an electrical power from rotations of a driven wheel 4 allows a braking power to be effected by operating the motor generator as a generator and storing, in the battery, a generated or regenerative power which is an energy that is conventionally converted into heat by a mechanical brake. The additional use or conditional use of a mechanical brake can improve braking performance of the vehicle.

Further, the motor generator 8 can be driven in accordance with the traveling conditions, such as the vehicle speed or running resistance, of the vehicle 2, in order to provide a regime of rotational speed and torque in which the main drive source 5 can be driven with better efficiency, thereby improving traveling performance of the vehicle 2. For instance, the motor generator 8 may perform drive power assisting during acceleration, or may provide an additional drive power or generate an electrical power during constant speed traveling or in cruising state of the vehicle 2, so as to allow the main drive source 5 to be driven with better efficiency and so as to recover an appropriate regenerative power. Especially, when the main drive source 5 uses an internal combustion engine (a gasoline engine or a diesel engine), its efficiency greatly varies between different rotational speeds or between different torques. Thus, drive power assisting by the motor generator 8 for improved efficiency of the main drive source 5 may prove to be more beneficial.

The motor generator 8 mounted to the wheel support bearing assembly 31 is of a direct drive design—in which the rotor 42 of the motor generator 8 is fixed to a rotational ring of the wheel support bearing assembly 31 without interposition of a speed reducing mechanism or a speed increasing mechanism—and does not require a clutch, a mechanical power distributing mechanism, a driveshaft, etc., thereby providing a simplified structure to transfer an auxiliary mechanical power and also minimizing the increase of the vehicle weight. As such, vehicle performances such as traveling performance, braking performance and fuel consumption rate of the vehicle can be improved, and also, a structure to transfer an auxiliary mechanical power can be simplified.

In the present invention, the vehicle 2 may have a plurality of driven wheels 4, for each of which the motor generator 8 is configured to be provided, and the vehicle power assist system may further include a plurality of separate controllers 9, each configured to individually control the motor generator 8 at each of the driven wheels 4. In such a configuration, each motor generator 8 can be individually controlled during acceleration or a turning movement at the time of, for example, changing travel lanes, to enable a more stable travel of the vehicle 2.

In such a configuration, the vehicle power assist system may further include an individual-motor-generator commander 15 configured to output, to each of the separate controllers 9 for each of the motor generators 8, a command that causes the separate controller 9 to perform driving operation control and regenerative operation control, with the individual-motor-generator commander 15 being provided in a superordinate ECU 10 that performs supervisory control of the vehicle 2. Providing the individual-motor-generator commander 15 in the superordinate ECU 10 makes it more convenient to execute control for operating each of the motor generators 8 independently to provide assist in the aforementioned time of changing travel lanes or in performing a turning movement of the vehicle 2.

In the present invention, the vehicle 2 may have: a low voltage battery 20 that is used as a power source for a superordinate ECU 10 that performs supervisory control of the vehicle 2; and a medium voltage battery 19 that is used as a power source for accessory components and that has a charging voltage higher than that of the low voltage battery 20, and the power storage unit configured to be connected with the motor generator 8 may be the medium voltage battery 19.

To power the accessory components of a vehicle, higher voltages are preferred, as the resultant smaller currents are desirable, from the wiring perspective, for example, in terms of the thicknesses of wires and in terms of sheaths on wires. On the other hand, for basic electric components such as the superordinate ECU 10, the use of a 12V battery that has been common for many years is preferred for its reliability. Yet, a battery with an excessively high voltage may cause the issues of electric shock during maintenance. Therefore, in addition to a 12V, low voltage battery 20 that is used as a power source for the superordinate ECU 10, the provision of a medium voltage battery 19 that is used as a power source for auxiliary electric components other than the aforementioned basic electric components is desirable both from the wiring perspective and in terms of enhanced reliability. When such a medium voltage battery 19 is equipped, using this medium voltage battery 19 as a power source for a regenerative operation as well as a driving operation of the power assist motor generator 8 is advantageous from, for example, the wiring perspective. Note that the term "accessory component" used herein refers to any component—other than the aforementioned basic components that are essential for running the vehicle—among electric components that are present in a vehicle.

In the present invention, the vehicle power assist system may further include: a low voltage battery 20 configured to provide power supply to low voltage loads 22; a medium voltage battery 19 configured to provide power supply to medium voltage loads 23 of a voltage higher than the low voltage loads 22, with the medium voltage battery 19 having a charging voltage higher than that of the low voltage battery 20; and a converter 21 connecting the low voltage battery 22 and the medium voltage battery 19. The motor generator 8 may be configured to be electrically connected to the medium voltage battery 19, and the motor generator 8 may be configured to perform a regenerative operation from rotations of the driven wheel 4 to provide an electrical power to the medium voltage battery 19 and to receive a supplied electrical power from the medium voltage battery 19 to drive the driven wheel 4 into rotation.

Also in such a configuration, it is possible, just as in the aforementioned configuration, to perform drive assist, regenerative braking and power generation with a driven wheel 4 of a vehicle so as to improve vehicle performances such as traveling performance, braking performance and fuel consumption rate of the vehicle and so as to provide a simplified structure to generate an auxiliary drive power, thereby minimizing the increase of the vehicle weight. Furthermore, in the case of such a configuration, a medium voltage battery 19 is provided in addition to a low voltage battery 20 so that low voltage loads 22 are powered by the low voltage battery 20 and medium voltage loads 23 are powered by the medium voltage battery 19. This provision allows selecting whether to use a low voltage component or a medium voltage component for each of the components to be installed to the vehicle, thereby, just as in the aforementioned configuration, providing a system that is advantageous both from the wiring perspective and in terms of enhanced reliability.

In the present invention, the motor generator 8 may be sized to be accommodated within a radial extension between a brake caliper 37 and an outer ring 32 of the wheel support bearing assembly 31, the brake caliper 37 being configured to contact an outer periphery of a brake rotor 36 mounted to the rotational ring of the wheel support bearing assembly 31. The power assist motor generator 8, which has a bulk that can be accommodated between a brake caliper 37 and the wheel support bearing assembly 31, can be mounted with ease to a driven wheel of a vehicle of a conventional design by requiring only the modification of a knuckle component of the vehicle, and can also be mounted to any vehicles regardless of vehicle types.

Any combinations of at least two features, disclosed in the appended claims and/or the specification and/or the accompanying drawings should be construed as included within the present invention. In particular, any combinations of two or more of the appended claims should be equally construed as included within the present invention.

BRIEF DESCRIPTION OF THE DRAWINGS

In any event, the present invention will become more clearly understood from the following description of preferred embodiments thereof in connection with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference characters are used to denote like or corresponding parts throughout different figures, and:

DESCRIPTION OF EMBODIMENTS

Figure 1:
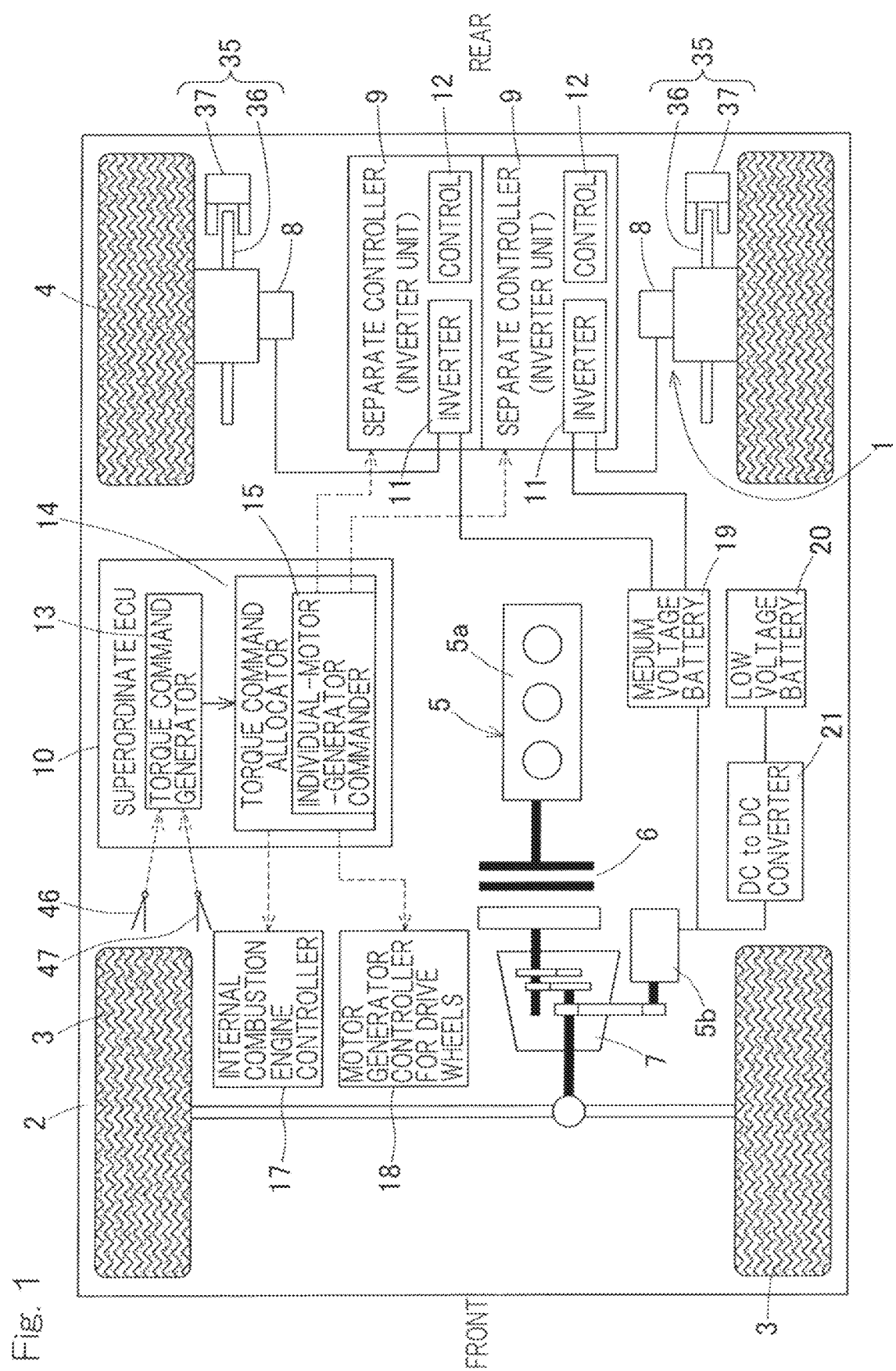
FIG. 1 is a block diagram depicting the concept configuration of a vehicle power assist system or a vehicle driven-wheel regenerative system, according to a preferred embodiment of the present invention.

An embodiment of the present invention will be described in connection with FIG. 1 to FIG. 5. The illustrated vehicle power assist system 1 is deployed to a vehicle 2 of a front wheel drive design or a rear wheel drive design, which has driven wheels 4 that are non-drive wheels. The system 1 can act on these driven wheels 4 which are mechanically unconnected to a main drive source 5. The main drive source 5 may be an internal combustion engine such as a gasoline engine or a diesel engine, a motor generator (electric motor), or a hybrid design drive source that combines both. It should be noted that the term "motor generator" used herein refers to an electric motor to which rotations can be applied to generate an electrical power. In the illustrated example, the vehicle 2 is a front wheel drive vehicle in which front wheels are drive wheels 3 and rear wheels are the driven wheels 4 and in which the main drive source 5 includes an internal combustion engine 5a and a motor generator 5b for the drive wheels, thereby forming a hybrid electric vehicle (which, hereinafter, may be referred to as "HEV.") More specifically, the vehicle 2 is of a mild hybrid design in which the motor generator 5b for the drive wheels is powered with a medium voltage of, for example, 48V.

Hybrids are roughly categorized into strong hybrids and mild hybrids. A mild hybrid refers to a design in which an internal combustion engine is used as a primary drive source and in which a motor is mostly used to perform drive assist at the time of starting or acceleration, etc. The mild hybrids can be distinguished from a strong hybrid in that, in EV (Electric Vehicle) mode, the mild hybrids can carry out a regular travel for only a limited time and not for an extended period of time. In the illustrated example, the internal combustion engine 5a is operatively coupled through a clutch 6 and a speed reducer 7 to a driveshaft for the drive wheels 3, and the motor generator 5b for the drive wheels is operatively coupled to the speed reducer 7.

The vehicle power assist system 1 includes: drive assist, motor generators 8 for driving the driven wheels 4 into rotation; separate controllers 9 for controlling the motor generators 8; and an individual-motor-generator commander 15—provided in a superordinate or higher level ECU 10—that outputs, to the separate controllers 9, commands that cause the separate controllers 9 to perform driving operation control and regenerative operation control. The motor generators 8 are connected to a power storage unit. The power storage unit can be used with no limits on its designs, for example, a battery (rechargeable battery) or a capacitor, and its installing locations on the vehicle 2. In the embodiment under discussion, the power storage unit is—among a low voltage battery 20 and a medium voltage battery 19 both of which are installed to the vehicle 2—the medium voltage battery 19.

The motor generators 8 for the driven wheels are direct drive motors without transmissions, which function as motors by supplying power and also function as generators by converting the kinetic energy of the vehicle 2 into an electrical power.

Figure 3:
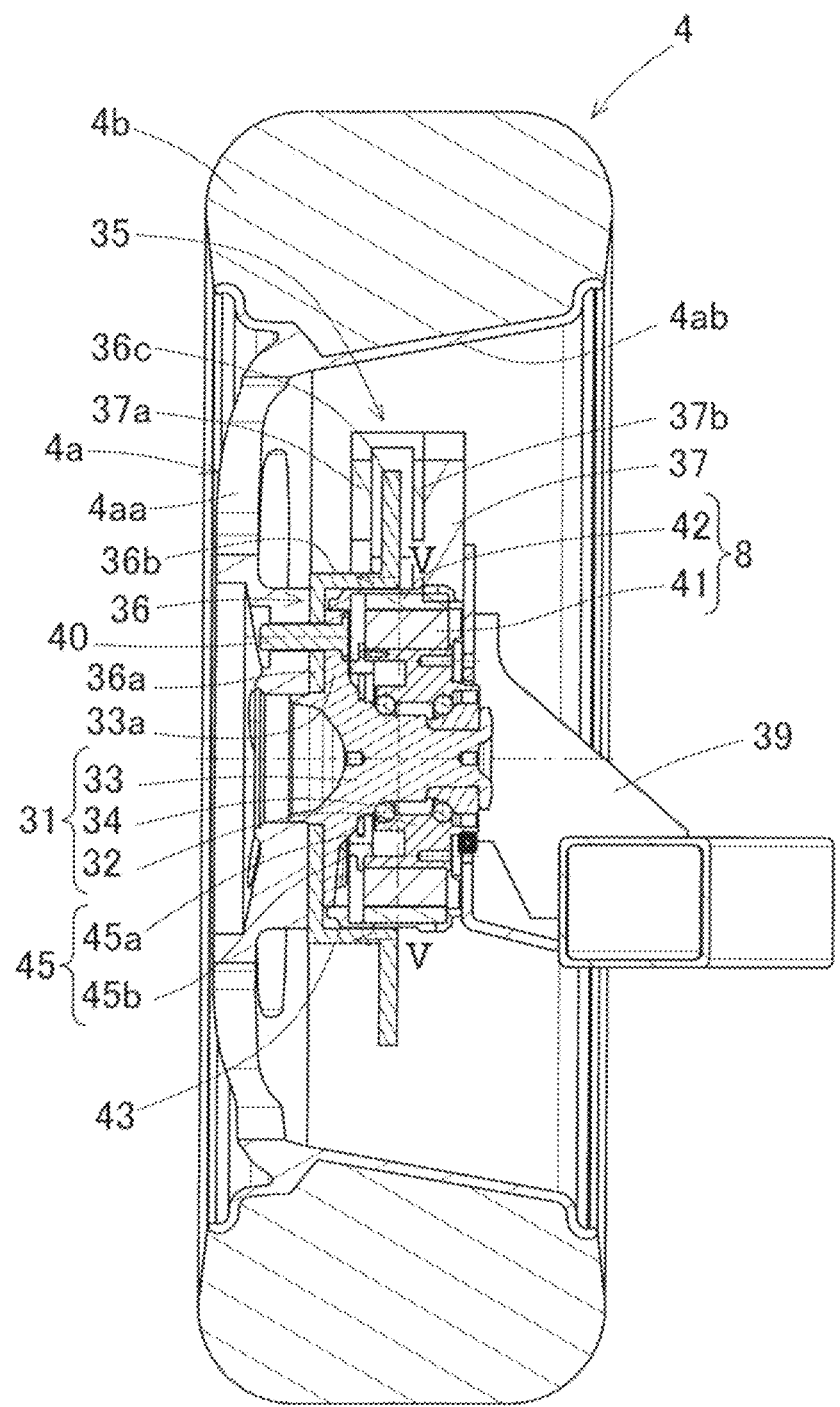
FIG. 3 shows a vertical cross-sectional view depicting a driven wheel to which a motor generator of the vehicle power assist system or the vehicle driven-wheel regenerative system is integrated, as well as a suspension system at the driven wheel.
Figure 4:
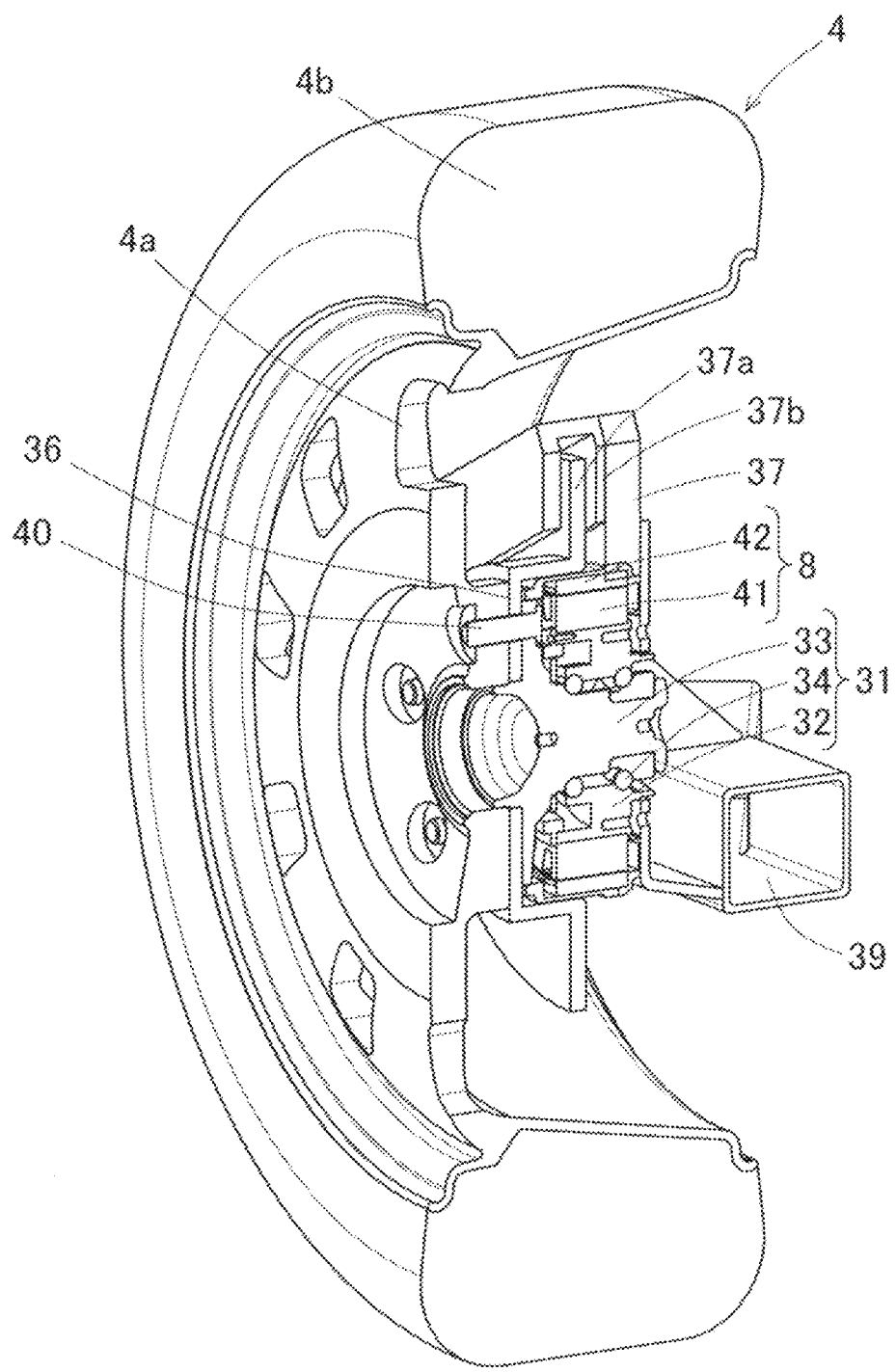
FIG. 4 shows a perspective view depicting the driven wheel as well as the suspension system at the driven wheel.

FIGS. 3 and 4 illustrate a driven wheel 4 to which such a motor generator 8 is installed. The motor generator 8 is configured between a wheel support bearing assembly 31 (which is also referred to as a "hub bearing") that supports the driven wheel 4 and a brake caliper 37 of a brake assembly 35. The wheel support bearing assembly 31 includes: an outer ring 32 that serves as a stationary ring; an inner ring 33 that serves as a hub unit; and a plurality of rows of rolling elements 34 arranged therebetween, with the outer ring 32 being fastened with bolts to a suspension frame component 39 such as a knuckle component. The inner ring 33 has a flange 33a to which a wheel body 4a of the driven wheel 4 and a brake rotor 36 of the brake assembly 35 are mounted in an overlapped fashion with bolts 40. The wheel body 4a has: a disc-shaped portion 4aa mounted to the inner ring 33; and a tapered, cylindrical portion 4ab that extends from an outer periphery of the disc-shaped portion 4aa towards an interior of the vehicle. A tire 4b is attached to the cylindrical portion 4ab. The wheel support bearing assembly 31 is entirely accommodated within an axial width of the wheel body 4a.

The brake rotor 36 is a disc type design that has: a disc-shaped portion 36a mounted to the inner ring 33; an intermediate cylindrical portion 36b that extends from an outer peripheral edge of the disc-shaped portion 36a to encircle part of the area defining the outer circumference of the wheel support bearing assembly 31; and a radially outer disc-shaped portion 36c that extends in a radially outer direction from a terminating end of the intermediate cylindrical portion 36b. The radially outer disc-shaped portion 36c is configured to be clamped by a pair of brake pads 37a and 37b that are caused to open or close upon actuation by the brake caliper 37. The brake caliper 37 may be a hydraulic type or a mechanical type, or may be actuated by an electric motor. The brake caliper 37 is mounted to the suspension frame component 39.

Figure 5:
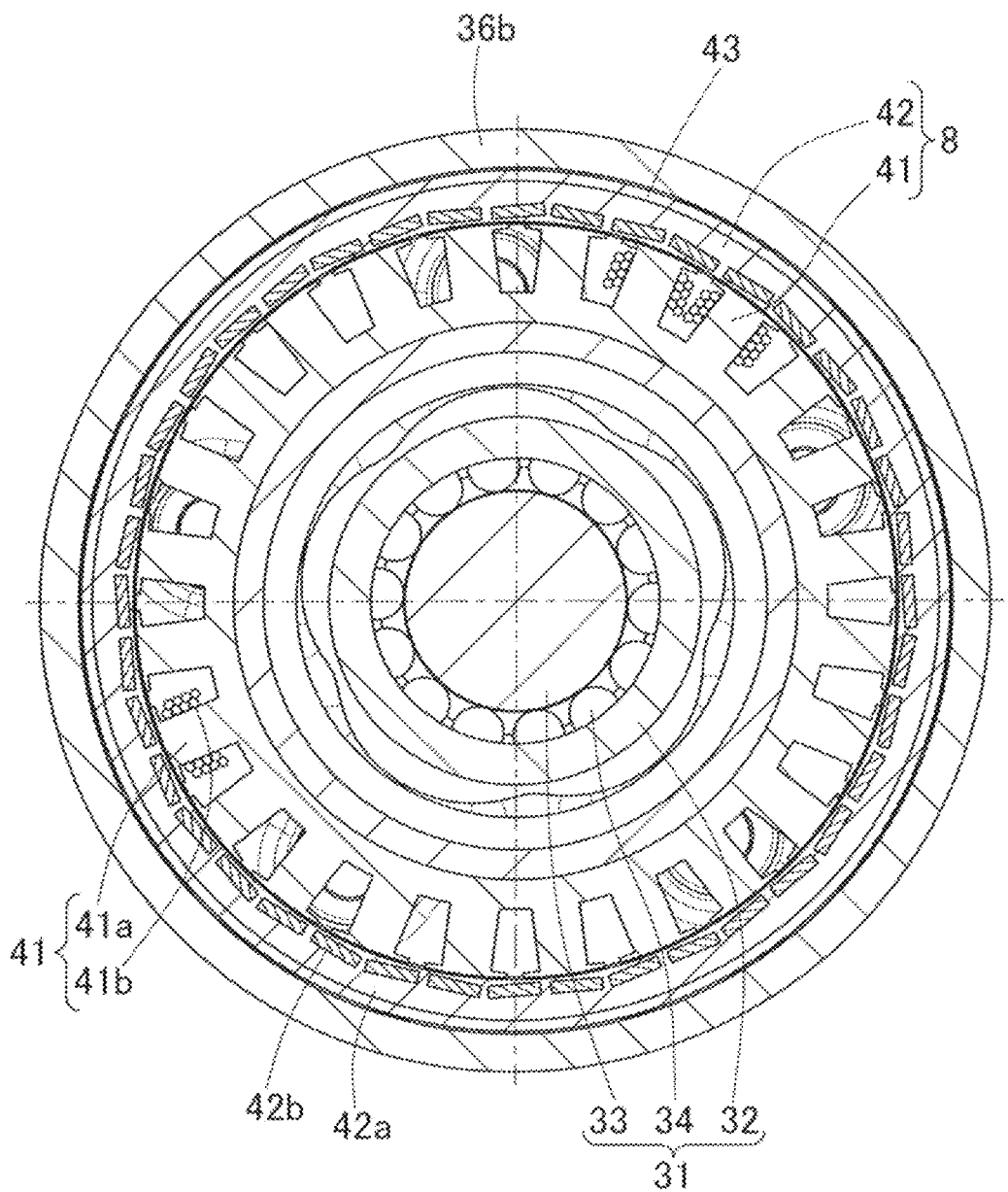
FIG. 5 shows an enlarged, cross-sectional view depicting the generator as cut along a plane perpendicular to an axial direction (cross-sectional view as taken along the line V-V in FIG. 3).

As shown in FIGS. 3 to 5, the motor generator 8 includes an annular stator 41 and an annular rotor 42, with the stator 41 being arranged on an inner peripheral side of the motor generator 8 and the rotor 42 being arranged over the outer periphery of the stator 41. The stator 41 is fixed integrally to the outer ring 32 of the wheel support bearing assembly 31 by being fitted thereto or by being fastened thereto with bolts. Although the stator 41 and the rotor 42 are shown in a simplified illustration, the motor generator 8 in the illustrated example is a synchronous motor—for example, an IPM motor—in which the stator 41 is formed of a stator core 41a and stator coils 41b. The stator coils 41b are wound on respective teeth of the stator core 41a. The rotor 42 is formed of a magnetic material 42a and permanent magnets 42b. The rotor 42 is, at one of axial ends thereof, fixedly mounted to the flange portion 33a of the inner ring 33 that serves as a hub unit, by, for example, being fitted or fastened thereto with the aid of an attachment 43. The rotor 42 has an axial extension, part of which is accommodated within the intermediate cylindrical portion 36b of the brake rotor 36.

As the rotor 42 of the motor generator 8 is mounted to the inner ring 33 that serves as a hub unit, application of electrical currents (power supply) to the motor generator 8 from the medium voltage battery 19 drives the inner ring 33 into rotation. On the other hand, induction of voltages during power regeneration allows recovery of regenerative power, thereby enabling the medium voltage battery 19 to be charged.

Since the motor generator 8 is configured between the area defining the outer circumference of the wheel support bearing assembly 31 and the brake caliper 37—more specifically, between that area and the intermediate cylindrical portion 36b of the brake rotor 36—it is unnecessary to modify the structures of components in the vicinity of the driven wheel, such as the structure of a shock absorber, in order to install the motor generator 8 to the vehicle 2. Also, existing parts of wheel support bearing assemblies, such as an inner ring 32, can be used for components of the wheel support bearing assembly 31, except for an outer ring 32. Note that, although the illustrated wheel support bearing assembly 31 is based on a third generation bearing assembly with inner ring rotation by way of example, the wheel support bearing assembly 31 can also be applied to other axle support bearing assemblies such as a bearing assembly with outer ring rotation, or a first generation or second generation bearing assembly. Moreover, although the illustrated motor generator 8 is an IPM motor of an outer rotor design, a motor generator of an inner rotor design can also be used. Furthermore, the motor generator 8 can be chosen from a variety of motors such as SPM motor, an IM motor, an SR motor, and so on. Also, the coils may be distributed winding coils or concentrated winding coils.

The wheel support bearing assembly 31 is associated with a rotation detector 45 between the flange portion 33a of the inner ring 33 and the outer ring 32. The rotation detector 45 includes: an encoder component 45a that is associated with the inner ring 33; and a sensor component 45b that is attached to the outer ring 32 to read the encoder component 45a. The rotation detector 45 can be used with no limits on its designs—such as a resolver, a Hall element, an optical type, or a magnetic type—and its installing locations.

Referring to FIG. 1, the control system of the vehicle 2 will be described. A superordinate ECU 10 is operable to perform supervisory control of the vehicle 2. In the superordinate ECU 10, a torque command generator 13 is provided which generates torque commands according to respective signals that are input from an accelerator operation unit 46 such as an accelerator pedal and from a brake operation unit 47 such as a brake pedal. The signals are inductive of the amount of operation by the accelerator operation unit 46 and of the amount of operation by the brake operation unit 47, respectively. The vehicle 2 includes, as a main drive source 5, an internal combustion engine 5a and a motor generator 5b for drive wheels and also includes two motor generators 8, 8 for driving two respective driven wheels 4 and 4. For this reason, a torque command allocator 14 is provided in the superordinate ECU 10, which allocates the torque commands among the respective drive sources 5a, 5b, 8 and 8 according to a defined rule. Torque commands for the internal combustion engine 5a are sent to an internal combustion engine controller 17 and are used by the internal combustion engine controller 17 to control, for example, valve opening. Torque commands for the motor generator 5b for the drive wheels are sent to a motor generator controller 18 for the drive wheels, for execution. Torque commands for the motor generators 8 and 8 for the driven wheels are sent to the separate controllers 9 and 9. In the torque command allocator 14, a module that feeds into the separate controllers 9 and 9 is referred to as an individual-motor-generator commander 15. Moreover, the individual-motor-generator commander 15 has functionality for providing to the separate controllers 9 torque commands which indicate brake powers that are assigned to the respective motor generators 8 and that should be effected by regenerative braking of the respective motor generators 8.

The separate controllers 9 are inverter units that each include: an inverter 11 for converting a DC power from the medium voltage battery 19 into a 3-phase AC voltage; and a control 12 for controlling an output that the inverter 11 produces by, for example, PWM control in accordance with the torque commands, etc. The inverter 11 includes a bridge circuit (not shown) that is formed of semiconductor switching elements, etc. and also includes a charge circuit (not shown) for charging the medium voltage battery 19 with a regenerative power from the associated one of the motor generators 8. Note that, although the separate controllers 9 are separately provided for each of the two motor generators 8 and 8, the separate controllers 9 and 9 may be integrated in a single unit having a single control 12 that is shared by both.

Figure 2:
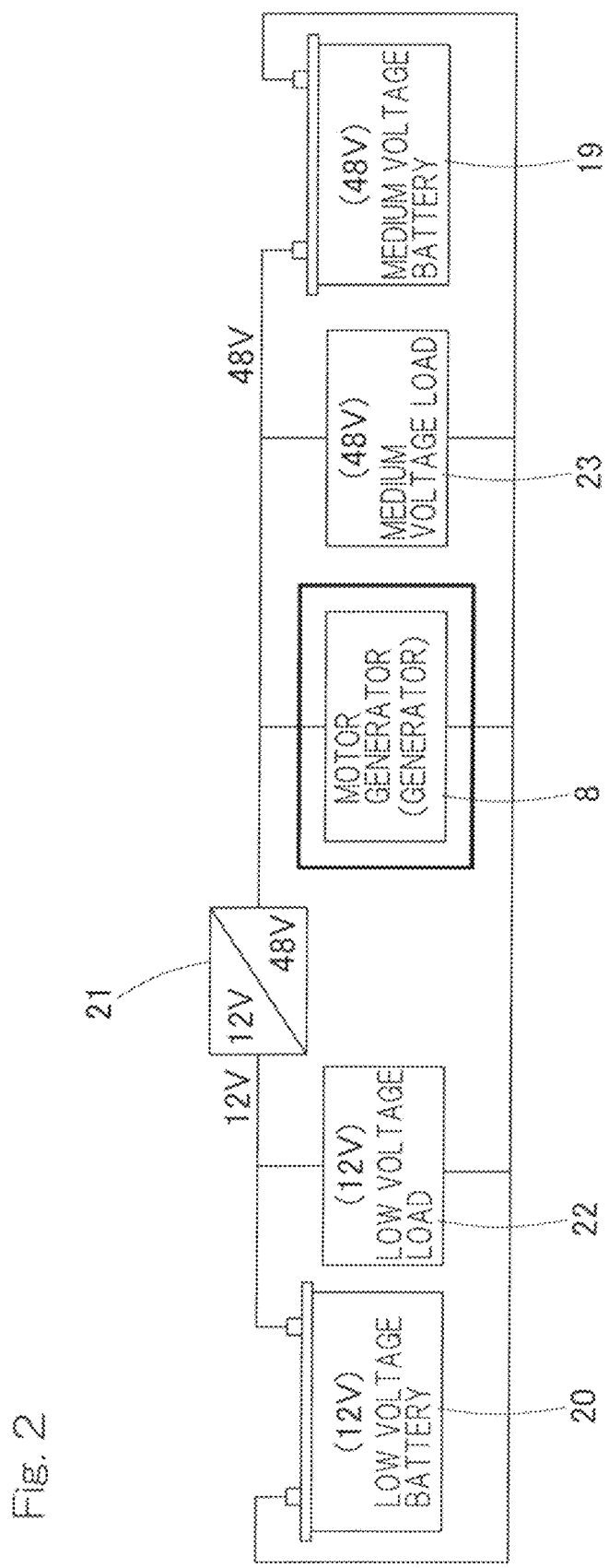
FIG. 2 is an example power supply system diagram for a vehicle with the vehicle power assist system or the vehicle driven-wheel regenerative system deployed thereto.

FIG. 2 is an electrical connection diagram of a power supply system for a (mild) hybrid vehicle shown in FIG. 1. In the illustrated example, the low voltage battery 20 and the medium voltage battery 19 are provided as a battery system, with the batteries 19 and 20 being connected to each other via a DC to DC converter 21. Although two motor generators 8 exist, a single, representative motor generator 8 is shown for purpose of illustration. Also, although an illustration of the motor generator 5b for the drive wheels in FIG. 1 has been omitted from FIG. 2, the motor generator 5b is, in reality, connected to a medium power system in parallel with the motor generators 8 for the driven wheels. Low voltage loads 22 are connected to a low voltage system, and medium voltage loads 23 are connected to the medium voltage system. A single, representative low voltage load 22 and a single, representative medium voltage load 23 are shown for purpose of illustration, although there are, in reality, a plurality of the low voltage loads 22 and a plurality of the medium voltage loads 23.

The low voltage battery 20 is generally used in various vehicles as a power source for a control system thereof and others and is, for example, 12V or 24V. The low voltage loads 22 include basic components such as a starter motor for the internal combustion engine 5a, lamps, the superordinate ECU 10 and other ECUs (not shown). For example, the low voltage battery 20 may be referred to as an auxiliary battery for electric/electronic and auxiliary components, whereas the medium voltage battery 19 may be referred to as an auxiliary battery for a motor system.

The medium voltage battery 19 has a higher voltage than that of the low voltage battery 20, but it has a lower voltage than that of a high voltage battery (100V or more; for example, about 200 to 400V) that is used in strong hybrid vehicles and the like. It is a voltage that is considered to have no risk of electric shock to a person working on the vehicle, and a 48V battery that is lately used in mild hybrid vehicles is suitable. The medium voltage battery 19 such as a 48V battery can be installed with relative ease to a traditional vehicle having an internal combustion engine and can be used as part of a mild hybrid system for performing electric power assist or for performing a regenerative operation to reduce fuel consumption.

The medium voltage loads 23 in the 48V system, which are the aforementioned accessory components, are loads of a voltage higher than the low voltage loads 22. The medium voltage loads 23 in the 48V system include—in addition to a power assist motor which serves as the motor generator 5b for the drive wheels—for example, an electric pump, an electric power steering system, a supercharger and an air compressor. By configuring the loads consisting of such accessories in the 48V system—although this may result in reduced power assist outputs as compared to those using a higher voltage (e.g. a strong hybrid vehicle with 100V or more)—the risk of electric shock to a passenger or a maintenance personnel can be lowered. Thinner insulating sheaths can be used for wires, thereby reducing the weights and the bulks of the wires. Furthermore, as compared to 12V, higher power levels can be input or output with smaller current levels, thereby allowing for the use of a more compact motor or generator. These factors contribute to the effect of reducing fuel consumption of the vehicle.

The vehicle power assist system according to the instant embodiment is suitable for such accessory components of a mild hybrid vehicle, and therefore, they may be used as components for power assist or power regeneration. It should be noted that, traditionally in a mild hybrid vehicle, a motor generator is disposed between an internal combustion engine and a transmission or between a gearbox and a rear differential (such a motor generator is referred to as a CMG and a GMG, respectively), or a belt driven starter motor is directly disposed onto an internal combustion engine (none of these configurations is shown). All of these configurations are sensitive to the efficiency of a transmission or a speed reducer, etc. because they act on an internal combustion engine or a power unit to perform power assist or a regenerative operation. In contrast, the vehicle power assist system 1 according to the instant embodiment is deployed to act on the driven wheels 4 and not to engage a main drive source such as an internal combustion engine 5b or an electric motor (not shown). For power regeneration, rotations of the driven wheels 4 can be used to perform a regenerative operation, thereby directly exploiting the kinetic energy of the vehicle body 1.

Furthermore, to incorporate the motor generator 8 at any given location along the length of a power train path that spans from the internal combustion engine 5b up to a tire, such incorporation of the motor generator 8 must be taken into account during a design stage of the vehicle 2. As such, it is challenging to retrofit the motor generator 8 to the vehicle at a later time. In contrast, the motor generator 8 in the vehicle power assist system 1 can be accommodated in a driven wheel 4, thereby allowing the motor generator 8 to be retrofit to a finished vehicle in the similar number of steps to that required for a regular, parts replacement operation. In this way, the 48V system can also be configured in a finished vehicle that only has an internal combustion engine 5b. Moreover, another motor generator 5b can also be installed—as in the example shown in FIG. 1—in a vehicle deployed with the vehicle power assist system 1 according to the instant embodiment. In this way, the magnitudes of power assist and power regeneration for the vehicle 2 can be increased, thereby further contributing to reducing fuel consumption.

The operations and the advantageous effects of the vehicle power assist system 1 of the aforementioned configuration are sorted and summarized as follows:

(1) Braking

By operating the motor generator 8 as a generator to effect a braking power and by storing a generated power—which is energy that is conventionally converted into heat by a mechanical brake—in the medium voltage battery 19 that is electrically connected with the motor generator 8, energy that is previously discarded can be recovered.

(2) Acceleration and Constant Speed Traveling

For a vehicle 2 that includes an internal combustion engine (engine) 5a as a main drive source 5, the motor generator 8 can be driven in accordance with the traveling conditions (e.g. the vehicle speed or running resistance) of the vehicle 2, in order to provide a regime of rotational speed and torque in which the engine can be run with better efficiency. In this way, the efficiency of the engine can be improved, thereby contributing to improved fuel economy. For instance, the motor generator 8 may perform drive power assisting during acceleration, or may provide an additional drive power or generate an electrical power during constant speed traveling or in cruising state of the vehicle 2.

(3) Improved Traveling Performance

Each motor generator 8 can be individually controlled during acceleration or a turning movement at the time of changing lanes to enable a more stable travel of a vehicle.

(4) Travel on Low Friction Road Surface

During initial movement or stopping of a vehicle on a low friction road surface such as when it is raining or when the road is snow-covered, the motor generator 8 may control the traction of a tire to stabilize the travel of the vehicle. Since the motor generator 8 is arranged within a tire 4b in close proximity to a road surface, better maneuverability with faster response can be achieved. Thanks to the provision of the rotation detector 45 (see FIG. 3), a built-in brake sensor or the like can be omitted.

(5) Mountability

For a conventional vehicle of a traditional design that is driven by an internal combustion engine, the mounting of the motor generator 8 can be done with a simpler method which requires only a slight level of design change of a suspension frame component 39 in order to mount the motor generator 8 to the suspension frame component 39.

Note that, although the aforementioned embodiment has been described with reference to an example in which the present invention is applied to a hybrid vehicle, the present invention can also be applied to a vehicle that includes only an internal combustion engine as a main drive source 5 or to a vehicle that includes only an electric motor as a main drive source 5.

The aforementioned embodiment is an example in which the vehicle power assist system 1 includes a motor generator 8, with the motor generator 8 being configured to generate an electrical power from rotations of a driven wheel 4 and receive a supplied electrical power to drive the motor generator 8 into rotation. As an alternative to the vehicle power assist system 1, however, a vehicle driven-wheel regenerative system 1 may be provided which has functionality for power generation but is not supplied with an electrical power to drive rotations In fact, referring to FIGS. 1 to 3, such a vehicle driven-wheel regenerative system 1 is applied to a vehicle 2 with a driven wheel 4 that is mechanically unconnected to a main drive source 5 that drives the travel of a drive wheel 3, which system 1 includes a generator 8 configured to generate an electrical power from rotations of the driven wheel 4, with the generator 8 being mounted to a wheel support bearing assembly 31 that supports the driven wheel 4. A rotor 42 of the generator 8 is fixed to an inner ring (rotational ring) 33 of the wheel support bearing assembly 31 without interposition of a speed reducing mechanism or a speed increasing mechanism. The vehicle driven-wheel regenerative system 1 also includes a medium voltage battery (power storage unit) 19 configured to store a regenerative power generated by the generator 8.

Also in such a configuration, it is possible—as in the aforementioned embodiment—to recover energy that is previously discarded. Thus, a braking power can be effected while storing, in the medium voltage battery 19, a regenerative power generated by the generator 8. The additional use or conditional use of a mechanical brake 35 can improve braking performance of the vehicle.

As the generator 8 is mounted to the wheel support bearing assembly 31 that is used for a driven wheel, the space for installing the generator 8 is easily available, thereby allowing the generator 8 to be installed without the need to significantly modify the designs of existing wheel support bearing assemblies. This enhances the universality of the vehicle driven-wheel regenerative system 1.

The generator 8 mounted to the wheel support bearing assembly 31 is of a direct drive design—in which the rotor 42 is fixed to an inner ring (rotational ring) 33 of the wheel support bearing assembly 31 without interposition of a speed reducing mechanism or a speed increasing mechanism—and does not require a clutch, a mechanical power distributing mechanism, a driveshaft, etc. This successfully reduces parts count to provide a simplified structure, thereby minimizing the increase of the vehicle weight. The ability to provide a simplified structure leads to cost reduction. Further, the ability to minimize the increase of the vehicle weight can reduce the fuel consumption rate of the vehicle.

By limiting the functionality to that for performing power generation, the separate controllers 9 may be configured as AC to DC converter units (not shown), instead of as inverter units. The AC to DC converter units serve the function of converting a 3-phase AC voltage into a DC voltage to charge the medium voltage battery 19 with a regenerative power from the generator 8. A control method required for the AC to DC converter units can be simplified as compared to that required for inverter units, thus allowing for size reduction. It should be noted that the motor generator 8 is used only for purpose of power generation as in the just-described embodiment, and in this case, the motor generator 8 can be referred to as a "generator 8".

In the foregoing, embodiments for carrying out the present invention have been described. The embodiments disclosed herein are, in all respects, for illustrative purpose only and have no limiting effect whatsoever. The scope of the present invention is defined not by the foregoing description but by the appended claims, and is meant to encompass all of the modifications within the meaning and purview of the claims as well as equivalents thereof.

It should be emphasized that the aforementioned embodiments encompass the following Implementations 1 and 2. In particular:

(Implementation 1)

Implementation 1 provides a vehicle power assist system for providing power assistance to a vehicle, which includes:

a low voltage battery configured to provide power supply to low voltage loads;

a medium voltage battery configured to provide power supply to medium voltage loads of a voltage higher than the low voltage loads, with the medium voltage battery having a charging voltage higher than that of the low voltage battery;

a converter connecting the low voltage battery and the medium voltage battery; and a motor generator configured to perform power regeneration from rotations of a driven wheel of the vehicle to provide an electrical power to the medium voltage battery and to receive a supplied electrical power from the medium voltage battery to drive the driven wheel into rotation, the motor generator being associated with a wheel support bearing assembly that is used for the driven wheel, the motor generator being configured to be electrically connected to the medium voltage battery.

According to Implementation 1, it is possible—just as in one of the aforementioned embodiments—to perform drive assist, regenerative braking and power generation with a driven wheel of a vehicle, so as to improve vehicle performances such as traveling performance, braking performance and fuel consumption rate of the vehicle and so as to provide a simplified structure to generate an auxiliary drive power, thereby minimizing the increase of the vehicle weight. Furthermore, in such a configuration according to Implementation 1, the provision of a medium voltage battery in addition to a low voltage battery—so that low voltage loads are powered by the low voltage battery and medium voltage loads are powered by the medium voltage battery—allows selecting whether to use a low voltage component or a medium voltage component for each of the components to be installed to the vehicle, thereby—just as in one of the aforementioned embodiments—providing a system that is advantageous both from the wiring perspective and in terms of enhanced reliability.

(Implementation 2)

Implementation 2 provides a vehicle driven-wheel regenerative system for a vehicle with a driven wheel that is mechanically unconnected to a main drive source that drives the travel of a drive wheel, which includes:

a generator configured to generate an electrical power from rotations of the driven wheel, the generator being mounted to a wheel support bearing assembly that supports the driven wheel, the generator having a rotor fixed to a rotational ring of the wheel support bearing assembly without interposition of a speed reducing mechanism or a speed increasing mechanism; and a power storage unit configured to store a regenerative power generated by the generator.

Note that the main drive source may comprise only an internal combustion engine, or a combination of an internal combustion engine and an electric motor, or—alternatively—only an electric motor.

According to Implementation 2 in which the generator is configured to generate an electrical power from rotations of a driven wheel, it is possible to recover energy that is previously discarded. Thus, a braking power can be effected while storing, in the power storage unit, a regenerative power generated by the generator. The additional use or conditional use of a mechanical brake can improve braking performance of the vehicle. As the generator is mounted to the wheel support bearing assembly that is used for a driven wheel, the space for installing the generator is easily available, thereby allowing the generator to be installed without the need to significantly modify the designs of existing wheel support bearing assemblies. The generator mounted to the wheel support bearing assembly is of a direct drive design—in which the rotor is fixed to a rotational ring of the wheel support bearing assembly without interposition of a speed reducing mechanism or a speed increasing mechanism—and does not require a clutch, a mechanical power distributing mechanism, a driveshaft, etc. This successfully reduces parts count to provide a simplified structure, thereby minimizing the increase of the vehicle weight. The ability to provide a simplified structure leads to cost reduction. Further, the ability to minimize the increase of the vehicle weight can reduce the fuel consumption rate of the vehicle.

REFERENCE NUMERALS

1 . . . vehicle power assist system (vehicle driven-wheel regenerative system)
2 . . . vehicle
3 . . . drive wheel
4 . . . driven wheel
4a . . . wheel body
5 . . . main drive source
5a . . . internal combustion engine
5b . . . motor generator for drive wheels
8 . . . motor generator (generator) for driven wheels
9 . . . separate controller
10 . . . superordinate ECU
13 . . . torque command generator
14 . . . torque command allocator
15 . . . individual-motor-generator commander
19 . . . medium voltage battery (power storage unit)
20 . . . low voltage battery
21 . . . DC to DC converter
23 . . . medium voltage load (accessory component)
31 . . . wheel support bearing assembly
32 . . . outer ring
33 . . . inner ring
35 . . . brake assembly
37 . . . brake caliper
36 . . . brake rotor
39 . . . suspension frame component
41 . . . stator
42 . . . rotor
45 . . . rotation detector

What is claimed is:

1. A vehicle power assist system for a vehicle with a driven wheel that is mechanically unconnected to a main drive source that drives the travel of a drive wheel, the vehicle power assist system comprising:

a drive assist, motor generator configured to be capable of generating an electrical power from rotations of the driven wheel and receiving a supplied electrical power to drive the driven wheel into rotation, the motor generator being mounted to a wheel support bearing assembly that supports the driven wheel, the motor generator having a rotor fixed to a rotational ring of the wheel support bearing assembly without interposition of a speed reducing mechanism or a speed increasing mechanism; and a power storage unit configured to store a regenerative power generated by the motor generator and to supply the stored power to the motor generator, wherein the motor generator is sized to be accommodated within a radial extension between a brake caliper and an outer ring of the wheel support bearing assembly, the brake caliper being configured to contact an outer periphery of a brake rotor mounted to the rotational ring of the wheel support bearing assembly.

2. The vehicle power assist system as claimed in claim 1, wherein the main drive source includes an internal combustion engine.

3. The vehicle power assist system as claimed in claim 1, wherein the vehicle has a plurality of driven wheels, for each of which the motor generator is configured to be provided, the vehicle power assist system further comprising:

a plurality of separate controllers, each configured to individually control the motor generator at each of the driven wheels.

4. The vehicle power assist system as claimed in claim 3, further comprising:

an individual-motor-generator commander configured to output, to each of the separate controllers for each of the motor generators, a command that causes the separate controller to perform driving operation control and regenerative operation control, the individual-motor-generator commander being provided in a superordinate ECU that performs supervisory control of the vehicle.

5. The vehicle power assist system as claimed in claim 1, wherein the vehicle has: a low voltage battery that is used as a power source for a superordinate ECU that performs supervisory control of the vehicle; and a medium voltage battery that is used as a power source for accessory components and that has a charging voltage higher than that of the low voltage battery, and the power storage unit configured to be connected with the motor generator is the medium voltage battery.

6. The vehicle power assist system as claimed in claim 1, further comprising:

a low voltage battery configured to provide power supply to low voltage loads;

a medium voltage battery configured to provide power supply to medium voltage loads of a voltage higher than the low voltage loads, the medium voltage battery having a charging voltage higher than that of the low voltage battery; and a converter connecting the low voltage battery and the medium voltage battery, wherein the motor generator is configured to be electrically connected to the medium voltage battery, and the motor generator is configured to perform a regenerative operation from rotations of the driven wheel to provide an electrical power to the medium voltage battery and to receive a supplied electrical power from the medium voltage battery to drive the driven wheel into rotation.

* * * * *